US012603854B2

(12) United States Patent
     Rola

(10) Patent No.: US 12,603,854 B2
(45) Date of Patent: Apr. 14, 2026

(54) ELECTRONIC TRACKING PROTECTION SYSTEMS AND METHODS

(71) Applicant: Avast Software s.r.o., Prague (CZ)

(72) Inventor: Iskander Sanchez Rola, Antibes (FR)

(73) Assignee: Gen Digital Inc., Tempe, AZ (US)

( * ) Notice: Subject to any disclaimer, the term of this patent is extended or adjusted under 35 U.S.C. 154(b) by 268 days.

(21) Appl. No.: 18/355,396

(22) Filed: Jul. 19, 2023

(65) Prior Publication Data

US 2025/0030654 A1      Jan. 23, 2025

(51) Int. Cl.
     *H04L 51/063*      (2022.01)
     *G06F 40/166*      (2020.01)
     *G06F 40/279*      (2020.01)
(52) U.S. Cl.
     CPC .......... *H04L 51/063* (2013.01); *G06F 40/166* (2020.01); *G06F 40/279* (2020.01)
(58) Field of Classification Search
     CPC ... G06F 40/166; G06F 40/279; H04L 51/063; H04L 51/18
     USPC .......................................................... 726/22
     See application file for complete search history.

(56) References Cited

U.S. PATENT DOCUMENTS

| | | | |
|---|---|---|---|
| 9,081,861 B2 * | 7/2015 | Lloyd ................... | G06F 16/951 |
| 10,601,865 B1 * | 3/2020 | Mesdaq .............. | H04L 63/1425 |
| 11,671,448 B2 | 6/2023 | Nunes et al. | |
| 2019/0036878 A1 * | 1/2019 | Morrison ........... | G06F 16/9566 |
| 2019/0163834 A1 * | 5/2019 | Johnson, Jr. .......... | G06F 16/214 |
| 2021/0294869 A1 * | 9/2021 | Gedliczka .......... | G06F 16/9566 |

OTHER PUBLICATIONS

Password Entropy Calculator, Anna Szczepanek, PhD, https://www.omnicalculator.com/other/password-entropy, accessed Jul. 16, 2023.

* cited by examiner

*Primary Examiner* — Lan Dai T Truong
(74) *Attorney, Agent, or Firm* — Dovas Law, P.C.

(57) ABSTRACT

An electronic tracking protection system and method enable receiving a particular electronic message, detecting in the particular electronic message a link including a particular uniform resource locator ("URL") including a parameter including a value. A uniqueness of the value is determined and the parameter is removed from the particular URL based on the uniqueness of the value to generate a modified URL. The particular URL is replaced with the modified URL in the particular electronic message based on the uniqueness of the value to generate a modified electronic message.

22 Claims, 4 Drawing Sheets

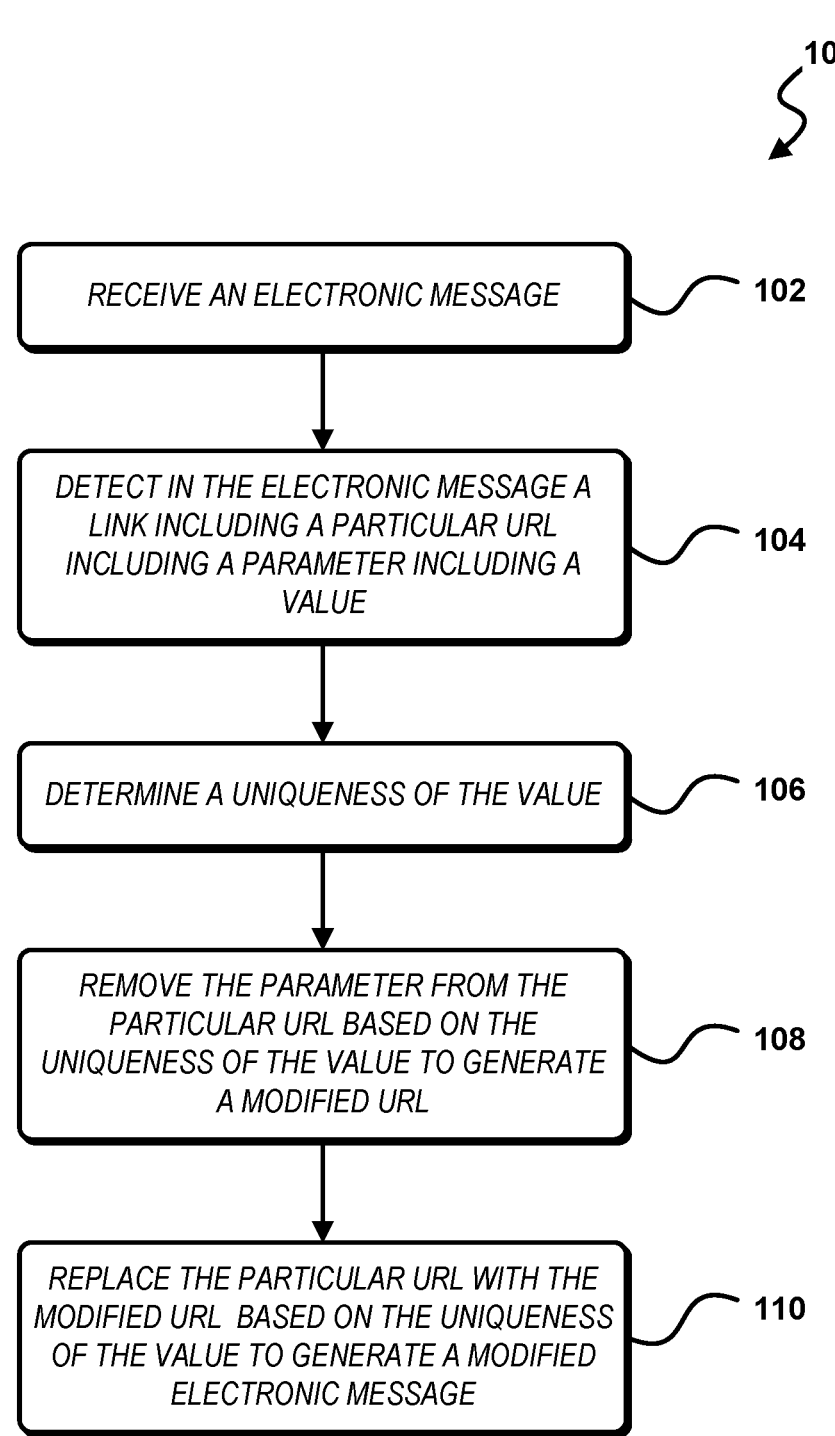

100

RECEIVE AN ELECTRONIC MESSAGE — 102

DETECT IN THE ELECTRONIC MESSAGE A LINK INCLUDING A PARTICULAR URL INCLUDING A PARAMETER INCLUDING A VALUE — 104

DETERMINE A UNIQUENESS OF THE VALUE — 106

REMOVE THE PARAMETER FROM THE PARTICULAR URL BASED ON THE UNIQUENESS OF THE VALUE TO GENERATE A MODIFIED URL — 108

REPLACE THE PARTICULAR URL WITH THE MODIFIED URL BASED ON THE UNIQUENESS OF THE VALUE TO GENERATE A MODIFIED ELECTRONIC MESSAGE — 110

FIG. 2

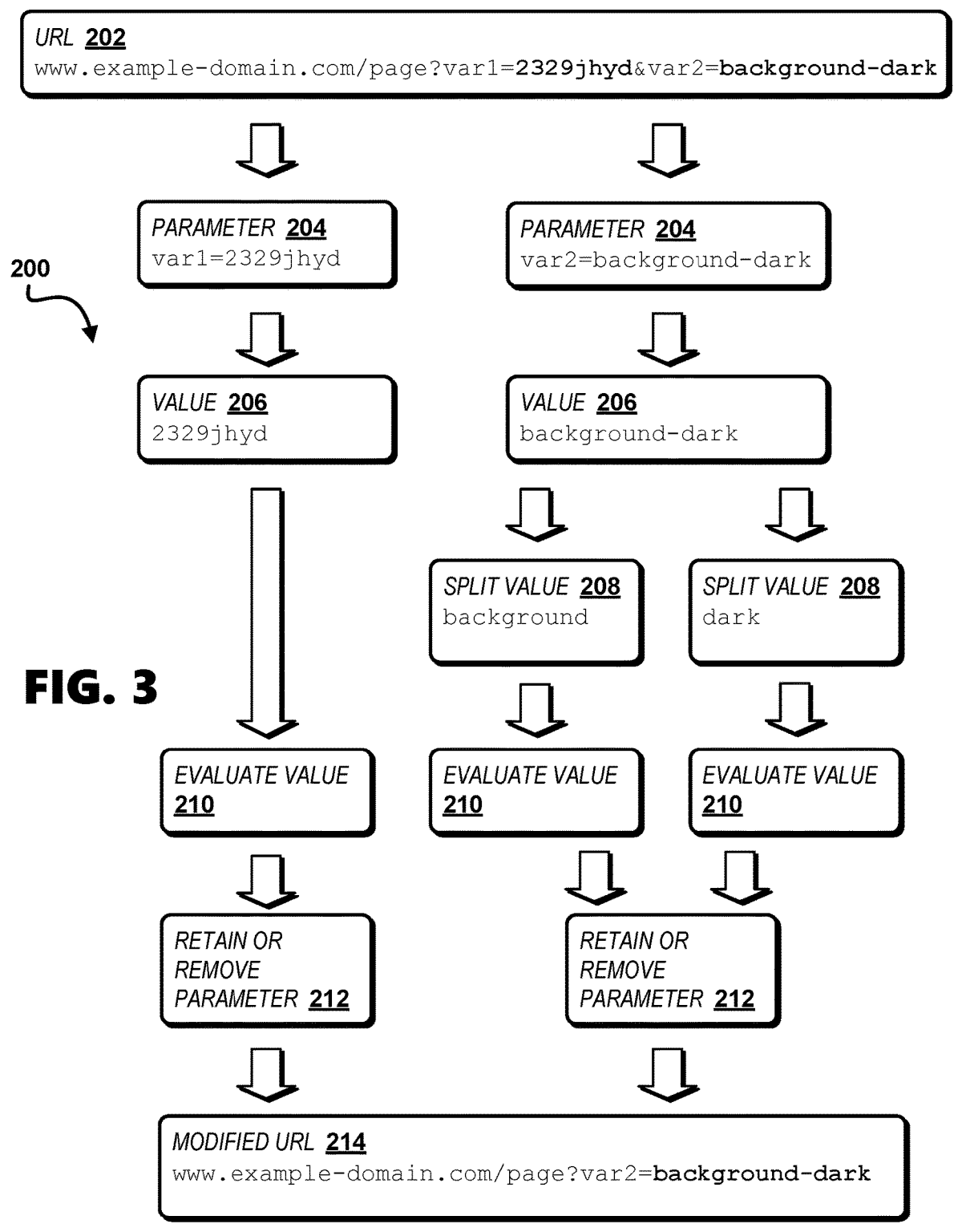

*URL* 202
www.example-domain.com/page?var1=2329jhyd&var2=background-dark

200

*PARAMETER* 204
var1=2329jhyd

*PARAMETER* 204
var2=background-dark

*VALUE* 206
2329jhyd

*VALUE* 206
background-dark

*SPLIT VALUE* 208
background

*SPLIT VALUE* 208
dark

FIG. 3

*EVALUATE VALUE*
210

*EVALUATE VALUE*
210

*EVALUATE VALUE*
210

*RETAIN OR REMOVE PARAMETER* 212

*RETAIN OR REMOVE PARAMETER* 212

*MODIFIED URL* 214
www.example-domain.com/page?var2=background-dark

ELECTRONIC TRACKING PROTECTION SYSTEMS AND METHODS

FIELD OF INVENTION

The disclosure relates generally to electronic tracking prevention.

BACKGROUND

Online user tracking has become prevalent on the internet. Trackers are incorporated into websites leaving computer users at risk of being tracked during web browsing. Emails may also enable trackers to follow users online. Typically, emails are HTML files that include different sets of images or links with parameters that can be used for a variety of reasons including marketing campaigns and user analytics. By opening an email or clicking on an element in an email, a user may trigger a network communication to enable tracking of the user by a network-enabled system.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method is provided including receiving a particular electronic message, detecting in the particular electronic message a link including a particular uniform resource locator ("URL") including a parameter including a value. A uniqueness of the value is determined and the parameter is removed from the particular URL based on the uniqueness of the value to generate a modified URL. The particular URL is replaced with the modified URL in the particular electronic message based on the uniqueness of the value to generate a modified electronic message.

A system is provided including one or more processors and memory storing executable instructions that, as a result of being executed, cause the system to perform operations. The operations include receiving a particular electronic message and detecting in the particular electronic message a particular link including a particular uniform resource locator ("URL") including a particular parameter including a particular value. The operations also include determining a uniqueness of the particular value and removing the particular parameter from the particular URL based on the uniqueness of the particular value to generate a modified URL. The operations further include replacing the particular URL with the modified URL in the particular electronic message to generate a modified electronic message.

A non-transitory computer-readable storage medium is provided which stores executable instructions that, as a result of execution by one or more processors of a computer system, cause the computer system to perform operations. The operations include receiving a particular electronic message and detecting in the particular electronic message a first link including a first uniform resource locator ("URL") including a first domain name and a particular parameter including a particular value. The operations also include comparing the first domain name of the first URL to a list of particular names, determining a uniqueness of the particular value, and removing the particular parameter from the first URL based on the uniqueness of the particular value to generate a modified URL. The operations further include detecting in the particular electronic message a second link including a second URL including a second domain name and comparing the second domain name of the second URL to the list of the particular names. The operations further include replacing the first URL with the modified URL in the particular electronic message based on the uniqueness of the particular value and based on the comparing the first domain name of the first URL to the list of the particular names and removing the second URL from the particular electronic message based on the comparing the second domain name of the second URL to the list of the particular names to generate a modified electronic message, and rendering the modified electronic message accessible via a computing system.

BRIEF DESCRIPTION OF THE DRAWINGS

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIG. 2 is a diagram showing a method for protecting against electronic tracking.

FIG. 3 is a process flow providing details of an exemplary implementation of the method of FIG. 2.

DETAILED DESCRIPTION OF ILLUSTRATIVE EMBODIMENTS

Described herein are systems and methods that allow enforcement of tracker blocking policies on electronic messages (e.g., emails, electronic text messages), incorporating HyperText Markup Language ("HTML") or including network links to webpages, without breaking the functionality or user experience ("UX") intended by the senders of the electronic messages.

There are many types of trackers in emails and other electronic messages. Some trackers only enable tracking-related behavior and do not relate to the functionality of the electronic message or the UX. Other trackers in electronic message allow users to interact with particular parts of an HTML document via a network connection, potentially affecting the UX enabled by the electronic message. In order to preserve the intended functionality of an electronic message and the network destinations linked thereto, tracking blocking policies enforced need to depend on the type of tracker.

As described herein, reference to "first," "second," and "third," components (e.g., a "first domain name," a "second domain name") or "particular" or "certain" components or implementations (e.g., a "particular electronic message," a "certain user," a "particular uniform resource locator," a "particular parameter", a "particular implementation") is not used to show a serial or numerical limitation or a limitation of quality but instead is used to distinguish or identify the various components and implementations.

Figure 1:
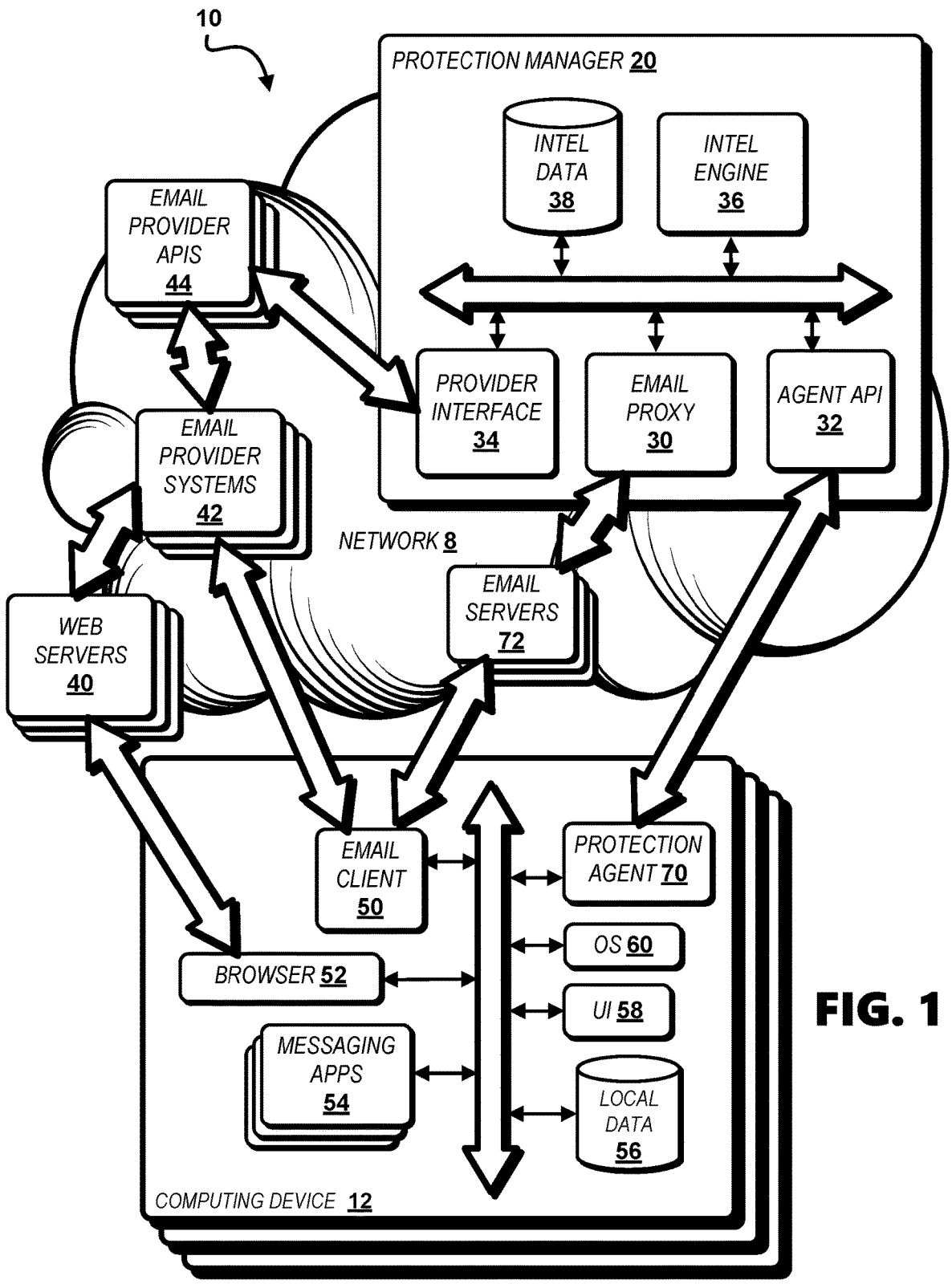
FIG. 1 shows an environment enabled by a computer network in which a network-connectable processor-enabled protection manager enables electronic tracking protection.

Referring to FIG. 1, an environment 10 enabled by a computer network 8 is illustrated in which a network-connectable processor-enabled protection manager 20 facilitates detecting tracking threats to users of computing devices 12. The computer network 8 includes one or more wired or wireless networks or a combination thereof, for example a local area network (LAN), a wide area network (WAN), the internet, mobile telephone networks, and wireless data networks such as Wi-Fi™ and 3G/4G/5G cellular networks. A protection agent 70, for example a browser extension, a browser integration, an email client extension, or an email client integration enables monitoring of one or both of communications performed by an email client 50 or network browsing activities performed on a browser application ("browser") 52 on a computing device 12. The protection agent 70 further enables aggregating of email data and browsing history and clickstream of the user on the computing device 12, and storing of aggregated information in a local datastore 56. Monitoring by the protection agent 70 provides the protection manager 20 with intelligence data including data files and ordered sequences of hyperlinks included in emails or followed by a user at one or more websites or other network destinations. Hyperlinks can include for example tracker links embedded in HTML emails for tracking when a user opens an email or tracking when a user navigates to a network destination enabled by a tracker link. Data gathered by the protection agent 70 is transmitted by the protection agent 70, received by the protection manager 20 via an agent application program interface ("API") 32, and stored in de-identified form in an intelligence datastore 38.

The protection manager 20 aggregates tracking data including hyperlinks in the form of universal resource locators ("URLs") from a plurality of computing devices 12 via the protection agent 70 executed on the plurality of computing devices. The protection agent 70 monitors communications via the email client 50 and messaging applications 54. The protection agent 70 further monitors communications via the browser 52 including user activity on network-based applications and websites enabled by the web servers 40 including browser-based email services (e.g., GMAIL™, YAHOO MAIL™) enabled by email provider systems 42. Monitored data is stored in the local datastore 56 and fed to the protection manager 20 via the agent API 32 and stored in the intelligence datastore 38, beneficially in de-identified form, which data is used in identifying URLs enabling tracking functionality ("tracking URLs"). The agent API 32 communicates with the protection agent 70 via the computer network 8. Alternatively, the protection manager 20 can be provided as an application on the computing device 12, for example as an integration or extension to the browser 52, and the protection agent 70 can communicate locally with the protection manager 20 via the agent API 32 on the computing device 12.

The protection agent 70 can be provided integral with or as an extension or plugin to one or more email clients 50, one or more browsers 52, or one or more messaging applications 54 and provides notices to a user via a user interface 58. The protection agent 70 monitors emails and other electronic communications from and to the email client 50 and messaging applications 54. The protection agent 70 further monitors user actions including logins, browsing history, and clickstreams from a browser 52 with which it is integrated or in communication with, which data is transmitted to the protection manager 20 via the agent API 32 and stored in the intelligence datastore 38. The protection manager 20 provides information for identifying tracking URLs to the protection agent 70 via the agent API 32 for enabling the protection agent 70 to provide notifications to a user and to filter or remove tracking URLs confronted by a email client 50, browser 52, or messaging application 54, which information is stored in the local datastore 56. An operating system 60 (hereinafter "OS 60") is executed on the computing device 12 which enables integration of the protection agent 70 with one or more of the browser 52, email client 50, or messaging application 54. The protection agent 70 is beneficially executed on a plurality of computing devices 12 of a plurality of users allowing aggregation by the protection manager 20 of de-identified data from the plurality of computing devices 12.

The protection manager 20 includes a provider interface 34 configured to connect to email provider APIs 44, each enabled to connect to a corresponding email provider system 42. A user can provide email service login credentials to the protection manager 20, for example via the protection agent 70, and the protection manager 20 through the provider interface 34 can monitor emails received from and sent to the user via the email provider API 44 by applying the email service login credentials of a user.

The protection manager 20 further includes an email proxy 30 which enables a proxy email address of a user which receives email on behalf of the user, filters or removes tracking URLs in received emails, and forwards received emails after filtering or removing the tracking URLs to another email address in use by the user. The email proxy 30 can host the proxy email address and the other email address to which the received emails are forwarded. Alternatively, the user can retrieve an email from the user's proxy email address directly, before or after the email proxy 30 filters or removes tracking URLs from the email. The email proxy 30 can deliver emails to a user via email servers 72 directed to the email client 50 or through a web interface accessible by a user via the browser 52.

The protection manager 20, via the provider interface 34 or the email proxy 30, and the protection agent 70 and are each configured to perform processes for removing HTML trackers from electronic messages (e.g., emails). Processes described herein for removing HTML trackers can be performed by one or both of the protection agent 70 or the protection manager 20. The protection agent 70 and the protection manager 20 are configured to remove from received electronic messages HTML trackers having the exclusive purpose of providing analytics information to the sender or other party. The protection agent 70 and the protection manager 20 are configured to remove particular parameters from hyperlinks in electronic messages in the case that the hyperlinks link to network destinations that perform or are likely actions in addition to or other than analytics. Separators associated with removed parameters are also removed from hyperlinks.

Referring to FIG. 2, a method 100 for protecting against electronic tracking is shown. The method 100 is described with reference to the components of the environment 10, including the computing device 12, protection manager 20, web servers 40, email provider systems 42, email provider APIs 44, and email servers 72. The method is performable by the protection manager 20, via the provider interface 34 or the email proxy 30, or the protection agent 70, or by the protection manager 20 and the protection agent 70 acting in concert. Alternatively, the method 100 can be performed via other systems and is not restricted to being implemented by the components of the environment 10.

In a step 102, an electronic message is received. The electronic message includes for example an email, a Short Message Service ("SMS") message, or a Multimedia Messaging Service ("MMS") message. The electronic message is received by the protection agent 70 or the email proxy 30 or provider interface 34 of the protection manager 20 via one or more of an email provider system 42, a web server 40, an email server 72, or the email client 50.

One or more links are detected in the electronic message, the one or more links each including a particular uniform resource locator ("URL") including one or more parameters each including a value of the parameter (step 104). In a particular implementation, the one or more links are detected via the email proxy 30 which hosts one or more email addresses for a user of a computing device 12. In an alternative implementation, the protection agent 70 detects the one or more links in the electronic message by monitoring the email client 50, a messaging application 54, or the browser 52. In a further alternative implementation, the provider interface 34 detects the one or more links by accessing an email provider API 44 in communication with an email provider system 42.

A uniqueness of each value of each parameter of each particular URL is determined (step 106). The uniqueness is determined by the protection agent 70 or alternatively by the intelligence engine 36 enabled by the protection manager 20. The determining the uniqueness of a particular value includes one or more of comparing the particular value to a plurality of strings, determining a pattern in the particular value, or determining an entropy of the particular value, such that the uniqueness of the particular value is based on one or more of the comparing the particular value to the plurality of strings, the pattern in the particular value, or the entropy of the particular value. The uniqueness is determined by the protection agent 70 executed by the computing device 12 or by the intelligence engine 36 executed by the protection manager 20 based on data stored in the intelligence datastore 38 or the local datastore 56. In a particular implementation of the method 100, when the particular value exceeds a particular threshold bit size, the particular value is split the into a plurality of portions, a uniqueness of each of the plurality of portions is determined, and the uniqueness of the particular value is determined based on the uniqueness of one or more of the plurality of portions.

The email proxy 30, the provider interface 34, and the protection agent 70 are each configured to monitor communications received by one or more computing systems, for example the protection manager 20, the email provider system 42, and the computing device 12, to collect a plurality of uniform resource locators ("URLs") including a plurality of parameters including a plurality of values. Determining the uniqueness of a particular value detected in step 104 includes comparing the particular value to the plurality of values.

Based on a uniqueness of a value of a particular parameter of the particular URL detected in step 104, the particular parameter is removed from the particular URL to generate a modified URL (step 108). The particular URL is replaced with the modified URL to generate a modified electronic message (step 110).

The removing the particular parameter from the particular URL to generate the modified URL and the replacing the particular URL with the modified URL in the particular electronic message is for example responsive to the entropy of the particular value being above a particular threshold. Alternatively, if the entropy of the particular value is equal to or less than the particular threshold, the particular parameter is not removed from the particular URL. Any separator associated with the particular parameter in the particular URL is also removed from the particular URL to generate the modified URL.

In a particular implementation of the method 100, the electronic message is received via an electronic address associated with a user, and the modified electronic message is rendered accessible to the user via the electronic address associated with the user. The electronic address can be enabled for example by the email proxy 30 or an email provider system 42.

In another implementation of the method 100, the electronic message is received via a first electronic address associated with a user, and the modified electronic message is transmitted to a second electronic address associated with the user. The first electronic address can be enabled for example by the email proxy 30 as a proxy email address configured to receive emails from one or more user-selected senders, and the second electronic address can be enabled for example by the email proxy 30 or an email provider system 42 for as a main or working email address where a user customarily receives correspondence from non-specified contacts or the general population.

The method 100 supports enabling an agent on a computing device associated with a user, for example enabling the protection agent 70 on the computing device 12. The link in the particular electronic message is detected by the agent in step 104, and the modified electronic message is rendered accessible to the user by the agent via the computing device, for example by the protection agent 70 via the computing device 12.

The method 100 further supports monitoring electronic communications associated with a user via a network-accessible computing system, for example the email provider system 42. The email provider system 42 is monitored by the provider interface 34 via an email provider API 44, or alternatively, the email provider system 42 is monitored by a protection agent 70 via a web server 40 and a browser 52. The particular electronic message is received in step 102 based on the monitoring the electronic communications, for example by the provider interface 34 or the protection agent 70 The modified electronic message is rendered accessible to the user via the network-accessible computing system, for example rendered accessible by the provider interface 34 or the protection agent 70 via the email provider system 42.

Each particular URL of the detected links described in the method 100 includes a domain name. The method 100 can further include for each particular URL of each detected link, comparing the domain name of the particular URL to a list of particular names to determine a match, and determining the uniqueness of the particular value of the particular parameter of the particular URL in step 106 responsive to the determining the match. The list of the particular names includes for example names of domains associated with one or more code functionalities not limited to tracking functionalities. As an example, domains related to categories including image hosting services, video sharing platforms, or social networks can be determined to potentially include functionalities in addition to or aside from a tracking functionality. If a domain name in a particular URL in a particular email does not match with any domain associated with code functionalities not limited to tracking, the URL is removed from the particular electronic message to generate a modified electronic message. If a domain name in a particular URL of a detected link in a particular electronic message matches with a domain associated with code functionalities not limited to tracking, this suggests that removing the URL may be detrimental to a user experience ("UX") offered by the electronic message, and accordingly further processing of the URL and electronic message is performed via steps 106, 108, and 110 of the method 100.

In an extension to the method 100, the particular electronic message can include for example a first link including a first URL including a first domain name. The first domain name of the first URL is compared to a list of particular names for example determining a match. One or more of the determining the uniqueness of the particular value, the removing the particular parameter from the particular URL, or the replacing the particular URL with the modified URL in the particular electronic message to generate the modified electronic message is based on the comparing the first domain name of the first URL to the list of the particular names, for example based on determining the match. Further, a second link including a second URL including a second domain name is detected in the particular electronic message. The second domain name of the second URL is compared to the list of the particular names, and the second URL is removed from the particular electronic message to further generate the modified electronic message based on the comparing the second domain name of the second URL to the list of the particular names. For example, the second domain name of the second URL is compared to the list of the particular names to determine that the second domain name is not on the list of the particular names, and the second URL is removed from the particular electronic message to further generate the modified electronic message based on the determining that the second domain name is not on the list of the particular names.

Referring to FIG. 3, a process flow 200 provides details of an exemplary implementation of the method 100. The process flow 200 assumes receipt of an electronic message (e.g., an email) including the URL 202 including a set of parameters, depicted hypothetically for example as "www.ex-ample-domain.com/page?var1=2329jhyd&var2=background-dark". If it is determined that the URL 202 in the electronic message may include functionality aside from tracking, the set of parameters that are included in the URL 202 are extracted as one or more parameter name-value pair tuples 204 (e.g., "var1=2329jhyd" and "var2=background-dark") for determining the uniqueness of one or more values of the parameters in step 106 of the method 100. By determining the uniqueness of a value, it is determined whether content in a parameter is likely to be used as an identifier to track a user online. Tracking can occur for example as a result of a user opening an HTML email or other HTML electronic message or clicking on an HTML link in an email or other electronic message resulting in a navigation to a network location based on the identifier. A link including a URL including an identifier is for example sent to one recipient in an electronic message via one email address or one messaging application user account, such that when the URL is accessed via a network it is known that the recipient has engaged with the URL.

In determining the uniqueness under step 106 of the method 100, it is determined if the value 206 of the parameter name-value pair tuple 204 is less than a particular string length (e.g., less than 5 characters, or less than 10 characters). If it is determined that the value of the parameter name-value pair tuple is less than the particular string length, the value 206 is analyzed in unmodified form. If the value of the parameter name-value pair tuple 204 is greater than or equal to the particular string length, the value is split into split values 208 including two or more different tokens (e.g., "background-dark" split into "background" and "dark"), and each token is analyzed independently in value evaluation processes 210.

Continuing the determining of the uniqueness under step 106 of the method 100, in the value evaluation processes 210, values 206 and split values 208 are evaluated to determine if the values and the split values are likely to include an identifier. In performing the evaluations, one or more heuristics are implemented to determine if the values are likely to include an identifier. In a particular implementation, a password strength estimator is applied. For example, the ZXCVBN™ password strength estimator is applied to a value or a split token of a value to determine the value's complexity and identify patterns that resemble previously used sets in a predetermined database of sets (e.g., considering the length and distribution of an alphanumeric string).

The step 108 of the method 100 is enabled by a parameter retaining or removing process 212 in which if a value shows a strong indication of being an identifier, for example based on application of a password strength estimator to the value or a split token of the value, the parameter including the value is removed from the URL 202 to generate a modified URL 214 to avoid tracking. An exemplary modified URL 214 is depicted hypothetically as "www.example-domain.com/page?var2=background-dark" in which the hypothetical parameter "var1=2329jhyd" is removed from the hypothetical URL "www.example-domain.com/page?var1=2329jhyd&var2=background-dark" along with its separator "&". A value is determined to show a strong indication of being an identifier for example if the value or a split token of the value has a strength whose base-10 logarithm is at least 9 using the ZXCVBN™ estimator. Alternatively, a value is determined to show a strong indication of being an identifier for example by calculating entropy of the value and determining the entropy is greater than or equal to a particular threshold in bits, for example the entropy being greater than or equal to 40 bits. Entropy can be calculated for example based on a size of a pool of characters on which the password is based and a number of characters in the password.

In the value evaluation processes 210, if a value does not show a strong indication of being an identifier as determined by application of one or both of a password strength estimator (e.g., ZXCVBN™) or an entropy formula, the URL and corresponding parameter set under analysis is compared by the intelligence engine 36 to anonymized URLs and corresponding parameter sets stored in the intelligence datastore 38 ("stored URLs"). The stored URLs are aggregated from network accessible repositories or from electronic messages previously received via electronic message addresses monitored by a protection agent 70 or the protection manager 20. The stored URLs are received, for example, from messaging or email accounts of consenting anonymized users. Further referring to the parameter retaining or removing process 212, if the data indicates a parameter tuple or corresponding value is common between distinct electronic messages (e.g., emails) to distinct electronic message addresses, the parameter tuple is not removed from the URL 202 because the parameter is determined to be not specifically crafted for the analyzed email and hence not useful as an identifier. The exemplary modified URL 214 is depicted hypothetically as "www.example-domain.com/page?var2=background-dark" and retains the hypothetical parameter "var2-background-dark" based on the value evaluation processes 210 and the parameter retaining or removing processes 212.

Figure 4:
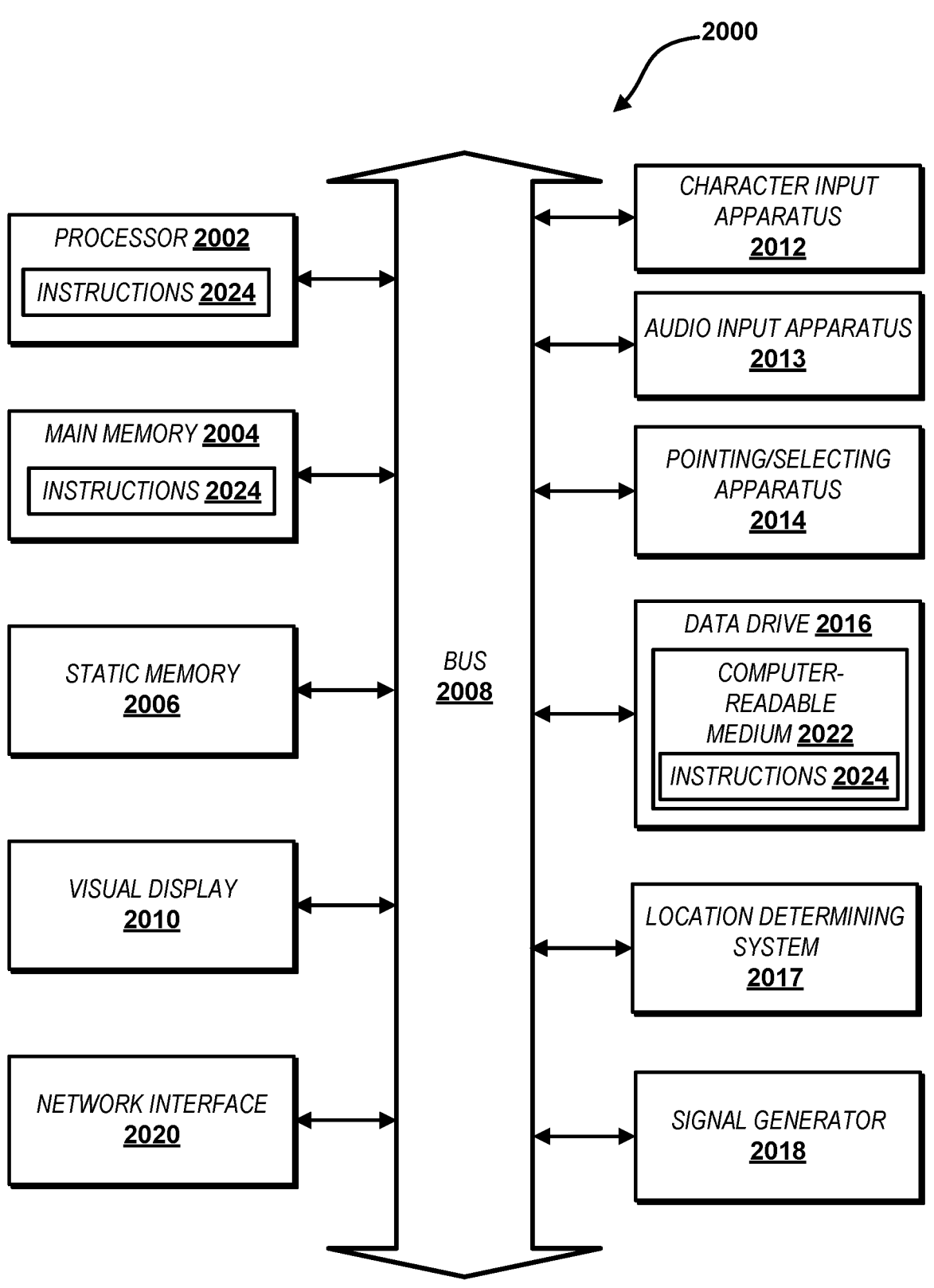
FIG. 4 shows a computer system for performing described methods according to illustrative embodiments.

FIG. 4 illustrates in abstract the function of an exemplary computer system 2000 on which the systems, methods and processes described herein can execute. For example, the computing device 12, protection manager 20, web servers 40, email provider systems 42, email provider APIs 44, and email servers 72 can each be embodied by a particular computer system 2000 or a plurality of computer systems 2000. The computer system 2000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein, for example in a cloud computing environment.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), a light emitting diode (LED) display, or a cathode ray tube (CRT) is provided for displaying data to a user of the computer system 2000. The visual display 2010 can be enabled to receive data input from a user for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network, for example the computer network 8, using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method comprising:
    receiving a particular electronic message comprising one of an email, a Short Message Service ("SMS") message, or a Multimedia Messaging Service ("MMS") message;
    detecting in the particular electronic message a particular link comprising a particular uniform resource locator ("URL") comprising a particular parameter comprising a particular value;

determining a uniqueness of the particular value;

removing the particular parameter from the particular URL based on the uniqueness of the particular value to generate a modified URL; and replacing the particular URL with the modified URL in the particular electronic message based on the uniqueness of the particular value to generate a modified electronic message.

2. The method of claim 1, wherein:

the determining the uniqueness of the particular value comprises comparing the particular value to a plurality of strings; and the uniqueness of the particular value is based on the comparing the particular value to the plurality of strings.

3. The method of claim 1, wherein:

the determining the uniqueness of the particular value comprises determining a pattern in the particular value; and the uniqueness of the particular value is based on the pattern in the particular value.

4. The method of claim 1, wherein:

the determining the uniqueness of the particular value comprises determining an entropy of the particular value; and the uniqueness of the particular value is based on the entropy of the particular value.

5. The method of claim 4, wherein the removing the particular parameter from the particular URL to generate the modified URL and the replacing the particular URL with the modified URL in the particular electronic message is responsive to the entropy of the particular value being above a threshold.

6. The method of claim 1, further comprising monitoring communications received by at least one computing system to collect a plurality of uniform resource locators ("URLs") comprising a plurality of parameters comprising a plurality of values, wherein determining the uniqueness of the particular value comprises comparing the particular value to the plurality of values.

7. The method of claim 1, wherein the particular URL comprises a first domain name, the method further comprising comparing the first domain name of the particular URL to a list of particular names to determine a match, wherein at least one of the determining the uniqueness of the particular value, the removing the particular parameter from the particular URL, or the replacing the particular URL with the modified URL in the particular electronic message to generate the modified electronic message is responsive to the determining the match.

8. The method of claim 7, wherein the particular link comprises a first link and the particular URL comprises a first URL, the method further comprising:

detecting in the particular electronic message a second link comprising a second URL comprising a second domain name;

comparing the second domain name of the second URL to the list of the particular names; and removing the second URL from the particular electronic message to further generate the modified electronic message based on the comparing the second domain name of the second URL to the list of the particular names.

9. The method of claim 7, wherein the particular link comprises a first link and the particular URL comprises a first URL, the method further comprising:

detecting in the particular electronic message a second link comprising a second URL comprising a second domain name;

comparing the second domain name of the second URL to the list of the particular names to determine that the second domain name is not on the list of the particular names; and removing the second URL from the particular electronic message to further generate the modified electronic message based on the determining that the second domain name is not on the list of the particular names.

10. The method of claim 1, wherein the particular link comprises a first link and the particular URL comprises a first URL comprising a first domain name, the method further comprising:

comparing the first domain name of the first URL to a list of particular names, wherein at least one of the determining the uniqueness of the particular value, the removing the particular parameter from the particular URL, or the replacing the particular URL with the modified URL in the particular electronic message to generate the modified electronic message is based on the comparing the first domain name of the first URL to the list of the particular names;

detecting in the particular electronic message a second link comprising a second URL comprising a second domain name;

comparing the second domain name of the second URL to the list of the particular names; and removing the second URL from the particular electronic message to further generate the modified electronic message based on the comparing the second domain name of the second URL to the list of the particular names.

11. The method of claim 1, further comprising:

splitting the particular value into a plurality of portions;

determining a uniqueness of each of the plurality of portions; and determining the uniqueness of the particular value based on the uniqueness of at least one of the plurality of portions.

12. The method of claim 1, further comprising:

receiving the particular electronic message via an electronic address associated with a user; and rendering the modified electronic message accessible to the user via the electronic address associated with the user.

13. The method of claim 1, further comprising:

receiving the particular electronic message via a first electronic address associated with a user; and transmitting the modified electronic message to a second electronic address associated with the user.

14. The method of claim 1, further comprising:

enabling an agent on a computing device associated with a user;

detecting by the agent the particular link in the particular electronic message; and rendering the modified electronic message accessible to the user by the agent via the computing device.

15. The method of claim 1, further comprising:

monitoring electronic communications associated with a user via a network-accessible computing system;

receiving the particular electronic message based on the monitoring the electronic communications; and rendering the modified electronic message accessible to the user via the network-accessible computing system.

16. The method of claim 1, wherein the particular URL comprises a separator associated with the particular parameter, the method further comprising removing the separator associated with the particular parameter from the particular URL to further generate the modified URL.

17. A system comprising:

one or more processors; and memory storing executable instructions that, as a result of being executed, cause the system to perform operations comprising:

receiving a particular electronic message comprising one of an email, a Short Message Service ("SMS") message, or a Multimedia Messaging Service ("MMS") message;

detecting in the particular electronic message a particular link comprising a particular uniform resource locator ("URL") comprising a particular parameter comprising a particular value;

determining a uniqueness of the particular value;

removing the particular parameter from the particular URL based on the uniqueness of the particular value to generate a modified URL; and replacing the particular URL with the modified URL in the particular electronic message to generate a modified electronic message.

18. The system of claim 17, wherein the particular link comprises a first link and the particular URL comprises a first URL comprising a first domain name, the operations further comprising:

comparing the first domain name of the first URL to a list of particular names, wherein at least one of the determining the uniqueness of the particular value, the removing the particular parameter from the particular URL, or the replacing the particular URL with the modified URL in the particular electronic message to generate the modified electronic message is based on the comparing the first domain name of the first URL to the list of the particular names;

detecting in the particular electronic message a second link comprising a second URL comprising a second domain name;

comparing the second domain name of the second URL to the list of the particular names; and removing the second URL from the particular electronic message to further generate the modified electronic message based on the comparing the second domain name of the second URL to the list of the particular names.

19. The system of claim 17, wherein:

the determining the uniqueness of the particular value comprises comparing the particular value to a plurality of strings and determining a pattern in the particular value; and the uniqueness of the particular value is based on the comparing the particular value to the plurality of strings and the determining the particular value.

20. A non-transitory computer-readable storage medium storing executable instructions that, as a result of execution by one or more processors of a computer system, cause the computer system to perform operations comprising:

receiving a particular electronic message comprising one of an email, a Short Message Service ("SMS") message, or a Multimedia Messaging Service ("MMS") message;

detecting in the particular electronic message a first link comprising a first uniform resource locator ("URL") comprising a first domain name and a particular parameter comprising a particular value;

comparing the first domain name of the first URL to a list of particular names;

determining a uniqueness of the particular value;

removing the particular parameter from the first URL based on the uniqueness of the particular value to generate a modified URL;

detecting in the particular electronic message a second link comprising a second URL comprising a second domain name;

comparing the second domain name of the second URL to the list of the particular names;

replacing the first URL with the modified URL in the particular electronic message based on the uniqueness of the particular value and based on the comparing the first domain name of the first URL to the list of the particular names; and removing the second URL from the particular electronic message based on the comparing the second domain name of the second URL to the list of the particular names to generate a modified electronic message; and rendering the modified electronic message accessible via a computing system.

21. The non-transitory computer-readable storage medium of claim 20, wherein:

the determining the uniqueness of the particular value comprises comparing the particular value to a plurality of strings; and the uniqueness of the particular value is based on the comparing the particular value to the plurality of strings.

22. The non-transitory computer-readable storage medium of claim 21, wherein:

the determining the uniqueness of the particular value further comprises determining a pattern in the particular value; and the uniqueness of the particular value is further based on the pattern in the particular value.

* * * * *